US011853410B2

(12) United States Patent
Ohashi et al.

(10) Patent No.: US 11,853,410 B2
(45) Date of Patent: Dec. 26, 2023

(54) CONTROL DEVICE AND CONTROL METHOD FOR AUTHENTICATING ANOTHER DEVICE USING INFORMATION OBTAINED FROM THE ANOTHER DEVICE

(71) Applicant: KABUSHIKI KAISHA TOKAI RIKA DENKI SEISAKUSHO, Aichi (JP)

(72) Inventors: Yosuke Ohashi, Aichi (JP); Masateru Furuta, Aichi (JP); Yuki Kono, Aichi (JP); Shigenori Nitta, Aichi (JP)

(73) Assignee: KABUSHIKI KAISHA TOKAI RIKA DENKI SEISAKUSHO, Aichi (JP)

( * ) Notice: Subject to any disclaimer, the term of this patent is extended or adjusted under 35 U.S.C. 154(b) by 153 days.

(21) Appl. No.: 17/229,190

(22) Filed: Apr. 13, 2021

(65) Prior Publication Data

US 2021/0365541 A1 Nov. 25, 2021

(30) Foreign Application Priority Data

May 25, 2020 (JP) .................................. 2020-090675

(51) Int. Cl.
*G06F 21/44* (2013.01)
*B60R 25/24* (2013.01)
*G07C 9/00* (2020.01)

(52) U.S. Cl.
CPC .............. *G06F 21/44* (2013.01); *B60R 25/24* (2013.01); *G07C 9/00309* (2013.01); *G07C 2009/00555* (2013.01); *G07C 2009/00769* (2013.01); *G07C 2209/63* (2013.01)

(58) Field of Classification Search
CPC .. G06F 21/44; G06F 2221/2111; B60R 25/24; B60R 25/241; B60R 25/01; B60R 25/04; B60R 2025/0405; B60R 2325/10; G07C 9/00309; G07C 2009/00555; G07C 2009/00769; G07C 2209/63; H04L 63/08; H04L 63/107; H04W 12/06; H04W 12/08; H04W 12/63; H04W 12/71
See application file for complete search history.

(56) References Cited

U.S. PATENT DOCUMENTS 10,268,190 B2 *   4/2019  Chin ...................... B60R 25/24
10,510,198 B2 *  12/2019  Austen ................. B60R 25/241
11,254,288 B1 *   2/2022  Elangovan ............. B60R 25/01
11,463,958 B2 *  10/2022  Furuta ............... H04W 52/0235
(Continued)

FOREIGN PATENT DOCUMENTS

CN     104980881     10/2015
JP     11-208419      8/1999
(Continued)

*Primary Examiner* — Brian E Miller
(74) *Attorney, Agent, or Firm* — GREENBLUM & BERNSTEIN, P.L.C.

(57) ABSTRACT

A control device and control method prevent an unnecessary authentication process from being executed. The control device includes a control section configured to perform an authentication process of authenticating another device by using information obtained through communication with the other device. In the case where a predetermined condition is satisfied, the control section performs control in such a manner that the authentication process is not performed.

10 Claims, 6 Drawing Sheets

(56) References Cited

U.S. PATENT DOCUMENTS

| | | | |
|---|---|---|---|
| 2005/0057408 A1* | 3/2005 | Asakura | B60R 25/245 343/711 |
| 2013/0169408 A1* | 7/2013 | Endo | G07C 9/00309 340/5.6 |
| 2013/0234827 A1* | 9/2013 | Tomita | G08C 17/02 340/5.61 |
| 2014/0300448 A1* | 10/2014 | Ochiai | G07C 9/00 340/5.72 |
| 2015/0296348 A1 | 10/2015 | Ghabra | |
| 2017/0190318 A1* | 7/2017 | Imamura | B60R 25/241 |
| 2017/0236351 A1* | 8/2017 | Menard | G01S 13/0209 340/5.61 |
| 2018/0350176 A1* | 12/2018 | Endo | B60R 25/24 |
| 2019/0053021 A1 | 2/2019 | Fuke | |
| 2019/0156603 A1* | 5/2019 | Breer | B60R 25/241 |
| 2020/0156591 A1* | 5/2020 | Arakawa | B60R 25/209 |
| 2020/0216025 A1* | 7/2020 | Le Bourgeois | B60R 25/241 |
| 2021/0016743 A1 | 1/2021 | Kusumoto et al. | |
| 2021/0136574 A1* | 5/2021 | Furuta | H04W 4/023 |
| 2021/0149584 A1* | 5/2021 | Kono | G06F 3/0604 |
| 2021/0168721 A1* | 6/2021 | Furuta | H04W 56/001 |
| 2021/0258716 A1* | 8/2021 | Oishi | H04W 4/023 |
| 2021/0291789 A1* | 9/2021 | Nawa | H04W 12/06 |
| 2021/0304533 A1* | 9/2021 | Ohashi | H04W 12/06 |
| 2021/0365541 A1* | 11/2021 | Ohashi | G07C 9/00309 |
| 2021/0367937 A1* | 11/2021 | Ohashi | H04W 12/06 |
| 2021/0370876 A1* | 12/2021 | Nagai | H04M 11/00 |
| 2021/0377734 A1* | 12/2021 | Nakada | H04W 12/047 |
| 2021/0385650 A1* | 12/2021 | Ohashi | H04W 12/03 |
| 2021/0385654 A1* | 12/2021 | Ohashi | G07C 9/20 |
| 2022/0091882 A1* | 3/2022 | Ohashi | G06F 9/4881 |
| 2022/0242367 A1* | 8/2022 | Kato | B60R 25/24 |
| 2023/0039407 A1* | 2/2023 | Furuta | H04L 5/0048 |
| 2023/0124612 A1* | 4/2023 | Furuta | B60R 25/24 713/176 |

FOREIGN PATENT DOCUMENTS

| | | |
|---|---|---|
| JP | 2015-059396 | 3/2015 |
| JP | 2019-031872 | 2/2019 |
| JP | 2019-183487 | 10/2019 |
| JP | 6629939 | 1/2020 |
| JP | 2020-059978 | 4/2020 |
| JP | 2021-189468 | 12/2021 |

* cited by examiner

CONTROL DEVICE AND CONTROL METHOD FOR AUTHENTICATING ANOTHER DEVICE USING INFORMATION OBTAINED FROM THE ANOTHER DEVICE

CROSS REFERENCE TO RELATED APPLICATION(S)

This application is based upon and claims benefit of priority from Japanese Patent Application No. 2020-090675, filed on May 25, 2020, the entire contents of which are incorporated herein by reference.

BACKGROUND

The present invention relates to a control device and a control method.

In recent years, technologies of authenticating a device in accordance with a result of transmitting/receiving a signal between devices have been developed. For example, JP H11-208419A discloses a technology of authenticating a portable device by transmitting/receiving a signal between an in-vehicle device and the portable device.

However, the conventional technology has a problem that there is a possibility of executing an unnecessary authentication process depending on situations.

Accordingly, the present invention is made in view of the aforementioned problem, and an object of the present invention is to provide a novel and improved control device and control method that make it possible to prevent the unnecessary authentication process from being executed.

SUMMARY

To solve the above-described problems, according to an aspect of the present invention, there is provided a control device including a control section configured to perform an authentication process of authenticating another device by using information obtained through communication with the other device. In the case where a predetermined condition is satisfied, the control section performs control in such a manner that the authentication process is not performed.

To solve the above-described problems, according to an aspect of the present invention, there is provided a control method including performing control in such a manner that a processor performs an authentication process of authenticating another device by using information obtained through communication with the other device. In the case where a predetermined condition is satisfied, control is performed in such a manner that the authentication process is not performed.

As described above, according to the present invention, it is possible to prevent an unnecessary authentication process from being executed.

DETAILED DESCRIPTION OF THE EMBODIMENT(S)

Hereinafter, referring to the appended drawings, preferred embodiments of the present invention will be described in detail. It should be noted that, in this specification and the appended drawings, structural elements that have substantially the same function and structure are denoted with the same reference numerals, and repeated explanation thereof is omitted.

1. Configuration Example

Figure 1:
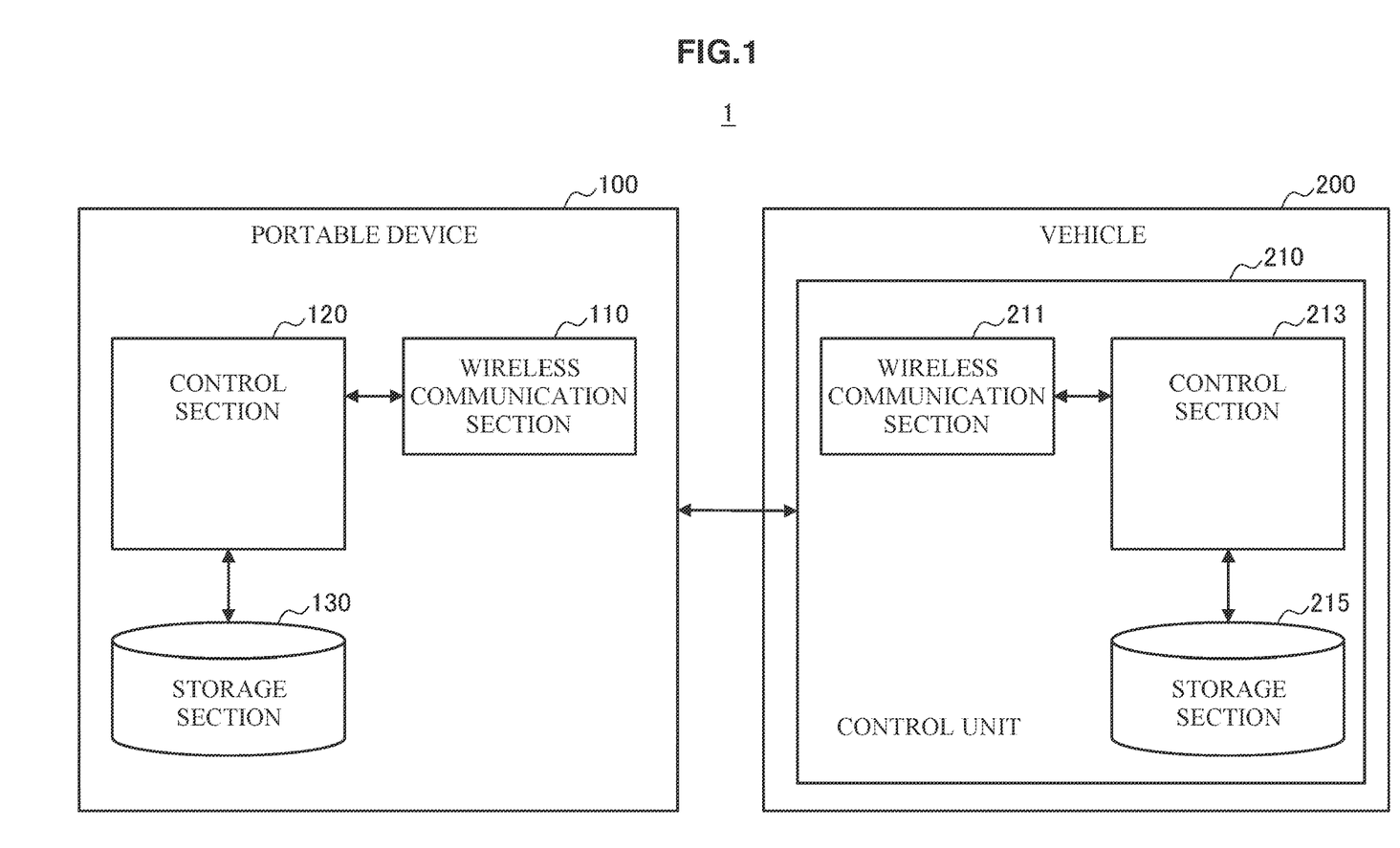
FIG. 1 is a diagram illustrating an example of a configuration of a system according to an embodiment of the present invention.

FIG. 1 is a diagram illustrating an example of a configuration of a system 1 according to an embodiment of the present invention. As illustrated in FIG. 1, the system 1 according to the present embodiment includes a portable device 100 and a control unit 210. The control unit 210 according to the present embodiment is installed in a vehicle 200. The vehicle 200 is an example of a mobile object, which is an example of a target to be used by a user.

A control device and another device are involved in the present invention. The control device includes a control section configured to perform an authentication process of authenticating the other device by using information obtained through communication with the other device. The other device is an authenticatee. In the example illustrated in FIG. 1, the portable device 100 is an example of the other device, and the control unit 210 is an example of the control device. When a user (for example, a driver of the vehicle 200) carrying the portable device 100 approaches the vehicle 200, the system 1 performs wireless communication for authentication between the portable device 100 and the control unit 210 of the vehicle 200. Next, when the authentication succeeds, the vehicle 200 becomes available for the user by opening a door lock of the vehicle 200 or starting an engine of the vehicle 200. The system 1 is also referred to as a smart entry system. Next, respective structural elements will be described sequentially.

(1-1) Portable Device 100

The portable device 100 is configured as any device. Examples of the any device include an electronic key, a smartphone, a wearable terminal, and the like, which are used while being carried by the user. As illustrated in FIG. 1, the portable device 100 includes a wireless communication section 110, a control section 120, and a storage section 130.

The wireless communication section 110 has a function of performing communication with the control unit 210 in conformity with a predetermined wireless communication standard. For example, the predetermined wireless communication standard uses an ultra-wideband (UWB) signal. An impulse UWB signal has a property that makes it possible to perform ranging with high accuracy. In other words, it is possible for the impulse UWB signal to measure air propagation time of a radio wave with high accuracy by using the radio wave of ultra-short pulse width of a nanosecond or lower, and it is possible to perform ranging with high accuracy on the basis of the propagation time. Here, the ranging means measurement of a distance between devices that transmit and receive the signal.

The wireless communication section 110 transmits and receives a signal for measuring a distance between devices in a ranging process. The ranging process is a process for measuring the distance between the devices.

An example of the signal used in the ranging process is a ranging signal. The ranging signal is a signal transmitted and received for measuring the distance between the devices. The ranging signal is also a measurement target signal. For example, time taken to transmit or receive the ranging signal is measured. For example, the ranging signal is configured in a frame format that does not include a payload part for storing data. In the ranging process, a plurality of the ranging signals may be transmitted and received between devices. Among the plurality of ranging signals, a ranging signal transmitted from one device to another device is also referred to as a first ranging signal, in this specification. Alternatively, a ranging signal transmitted from the device that has received the first ranging signal to the device that has transmitted the first ranging signal is also referred to as a second ranging signal.

The ranging signal may be transmitted and received as the UWB signal. The wireless communication section 110 is configured as a communication interface that makes it possible to perform communication by using the UWB signals.

The control section 120 has a function of controlling overall operation performed by the portable device 100. For example, the control section 120 controls the wireless communication section 110 to perform communication with the control unit 210. In addition, the control section 120 reads information from the storage section 130 and writes information into the storage section 130. The control section 120 also functions as an authentication control section that controls an authentication process between the portable device 100 and the control unit 210. For example, the control section 120 includes an electronic circuit such as a microprocessor and a central processing unit (CPU).

The storage section 130 has a function of storing various kinds of information for operating the portable device 100. For example, the storage section 130 stores a program for operating the portable device 100, and an identifier (ID), password, and authentication algorithm for authentication, etc. For example, the storage section 130 includes a storage medium such as flash memory and a processing device that performs recording/playback on/of the storage medium.

(1-2) Control Unit 210

The control unit 210 is prepared in association with the vehicle 200. Here, the control unit 210 is assumed to be installed in the vehicle 200. For examples of the installation position, the control unit 210 may be installed in a vehicle interior of the vehicle 200, may be built in the vehicle 200 as a control module or a communication module, or may be installed in other ways. Alternatively, the control unit 210 may be prepared as a separate object from the target to be used by the user in such a manner that the control unit 210 is installed in a parking space for the vehicle 200 or in other manners. In this case, the control unit 210 may wirelessly transmit a control signal to the vehicle 200 on the basis of a result of communication with the portable device 100 and may remotely control the vehicle 200. As illustrated in FIG. 1, the control unit 210 includes a wireless communication section 211, a control section 213, and a storage section 215.

The wireless communication section 211 has a function of performing communication with the portable device 100 in conformity with a predetermined wireless communication standard. The wireless communication section 211 is configured as a communication interface that makes it possible to perform communication by using the UWB signals, for example.

The control section 213 has a function of controlling overall operation performed by the control unit 210. As an example, the control section 213 controls the wireless communication section 211, communicates with the portable device 100, reads information from the storage section 215, and writes information into the storage section 215. The control section 213 also functions as an authentication control section that controls the authentication process between the portable device 100 and the control unit 210. In addition, the control section 213 also functions as a door lock control section that controls the door lock of the vehicle 200, and opens and closes the door lock. In addition, the control section 213 also functions as a light control section that controls whether to turn on or off a light installed in the vehicle 200. The control section 213 also functions as an engine control section that controls the engine of the vehicle 200, and starts/stops the engine. Note that, a motor or the like may be installed as a power source of the vehicle 200 in addition to or instead of the engine. For example, the control section 213 may be configured as an electronic control unit (ECU).

Note that, the control section 213 is an example of a control section that controls operation of the control device according to the present invention.

The storage section 215 has a function of storing various kinds of information for operating the control unit 210. For example, the storage section 215 stores a program for operating the control unit 210, an authentication algorithm, and the like. For example, the storage section 215 includes a storage medium such as flash memory and a processing device that performs recording/playback on/of the storage medium.

2. Technical Problem

Execution of the unnecessary authentication process results in waste of electricity with regard to wireless communication for authentication between the portable device 100 and the control unit 210 of the vehicle 200. The unnecessary authentication process is an authentication process performed in a situation where it is difficult to transmit and receive sufficient information to be used for authentication between the devices and it is highly possible that authentication ends in failure. For example, it is highly possible that authentication ends in failure in the case where the portable device 100 does not include a specific function that is necessary for the authentication process, or in the case where the portable device 100 is not appropriate for the authentication process.

Examples of the specific function that is necessary for the authentication process include a communication section that communicates information to be used for the authentication process. It is not preferable for the control unit 210 to try to perform wireless communication with the portable device 100 for authentication and consume electric power although the portable device 100 does not include the communication section. In addition, examples of the situation where it is not appropriate to perform the authentication process include a situation where the portable device 100 has a small amount of battery charge remaining, and a situation where a communication situation is poor. Examples of the "situation where the portable device 100 has a small amount of battery charge remaining" include a situation where the amount of battery charge remaining in the portable device 100 falls below a predetermined value. In addition, examples of the "situation where a communication situation is poor" include a situation where reception electric power (that is, an electric power value of a received signal) or a signal-to-noise ratio (SNR) to be used for wireless communication for authentication is less than or equal to a predetermined value. It is highly possible that a battery of the portable device 100 runs out and authentication ends in failure if the control unit 210 tries to perform wireless communication with the portable device 100 for the authentication in the case where the portable device 100 has a small amount of battery charge remaining, or in the case where a communication situation is poor. In addition, in the case where the portable device 100 has a small amount of battery charge remaining, or in the case where the communication situation is poor, it is highly possible that sufficient information to be used for the authentication is not transmitted or received and the authentication ends in failure. Accordingly, electric power is wasted if the control unit 210 tries to perform wireless communication with the portable device 100 for the authentication in the case where the portable device 100 has a small amount of battery charge remaining, or in the case where a communication situation is poor.

Therefore, according to the present invention, control is performed in such a manner that the authentication process for authenticating another device is not performed in the case where a predetermined condition is satisfied. This makes it possible to prevent the unnecessary authentication process from being executed and reduce an amount of power consumption.

3. Operation Process Example

Figure 2:
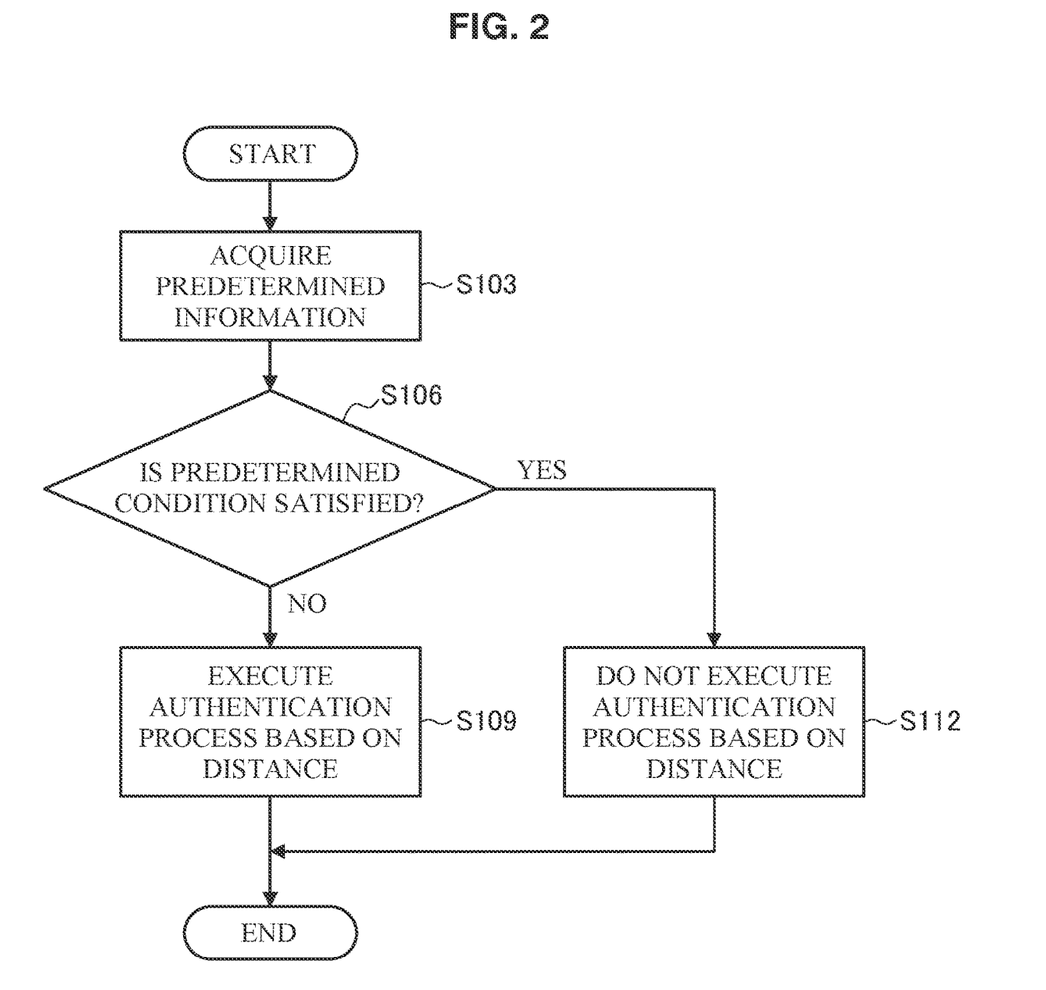
FIG. 2 is a flowchart illustrating an example of a flow of an operation process of a control unit according to the embodiment.

Next, with reference to FIG. 2, details of an operation process of the control unit 210 included in the system 1 according to an example of the present invention will be described. FIG. 2 is a flowchart illustrating an example of a flow of the operation process of the control unit 210 according to the present embodiment.

According to the present embodiment, an authentication process based on a distance between the portable device 100 and the control unit 210 is executed as an example of the authentication process. The control unit 210 appropriately controls execution of the authentication process. This makes it possible to reduce electric power wasted by the portable device 100 or the control unit 210.

Note that, in the present specification, the "authentication process based on the distance" includes a ranging process of measuring a distance between the portable device 100 and the control unit 210, and an authentication process of performing authentication on the basis of the distance measured through the ranging process. Details of the ranging process will be described later with reference to FIG. 3. In the latter authentication process, the control unit 210 authenticates the portable device 100 in accordance with whether or not the measured distance satisfies a predetermined condition (which is a predetermined condition for authentication, and is also referred to as an authentication condition in this specification). For example, the control unit 210 determines that the authentication succeeds if the measured distance is a predetermined value or less. If not, the control unit 210 determines that the authentication ends in failure. In addition, if the measured distance falls within a predetermined range, the control unit 210 may determine that authentication for performing corresponding predetermined control succeeds. For example, in the case where a distance between the user carrying the portable device 100 and the vehicle 200 in which the control unit 210 is installed falls within the predetermined distance, the control unit 210 determines that authentication for controlling the light installed in the vehicle 200 and causing the light to turn on succeeds, and the control unit 210 performs control in such a manner that the light is turned on. Next, in the case where the user approaches the vehicle 200 more, the control unit 210 may determine that authentication for controlling a door lock and opening the door lock of the vehicle 200 succeeds, and may perform control in such a manner that the door lock is opened.

First, as illustrated in FIG. 2, the control unit 210 according to the present embodiment acquires predetermined information to be used for determining whether or not to execute the authentication process based on the distance (Step S103). Examples of the predetermined information include information regarding a predetermined function of the portable device 100 and information regarding the state of the portable device 100.

Information Regarding Specific Information of Portable Device 100

Examples of the information regarding the specific function of the portable device 100 include information indicating whether or not the portable device 100 includes a communication section configured to communicate information to be used for the authentication process based on the distance. In the case where the UWB signal is used for the information to be used for the authentication process, the information regarding the specific function of the portable device 100 is information indicating whether or not the portable device 100 includes a communication section capable of communicating the UWB signal.

The control unit 210 may acquire the information regarding the specific function of the portable device 100, from the portable device 100. In other words, the portable device 100 transmits a signal including the information regarding the specific function, to the control unit 210.

Any frequency band can be used for transmitting the signal including the information regarding the specific function. For example, the signal including the information regarding the specific function may be transmitted by using a same frequency band as the ranging signal, or a different frequency band from the ranging signal. In addition, the signal including the information regarding the specific function may be transmitted as a UWB signal, an LF band signal, an RF band signal, or a Bluetooth Low Energy (BLE) (registered trademark) signal.

In addition, any other signal may also serve as the signal including the information regarding the specific function. Another example of any signal is a signal for request response authentication. For example, it is assumed that the request response authentication is performed between the portable device 100 and the control unit 210 before the authentication based on the distance. Here, the request response authentication is a method in which an authenticator (for example, the control unit 210 according to the present embodiment) generates an authentication request signal and transmits the generated authentication request signal to an authenticatee (for example, the portable device 100 according to the present embodiment), the authenticatee generates an authentication response signal on the basis of the authentication request signal and transmits the generated authentication response signal to the authenticator, and the authenticator authenticates the authenticatee on the basis of the authentication response signal. The authentication request signal is random numbers, and is changed with each authentication. Accordingly, the request response authentication is resistant to a replay attack. In addition, the authentication response signal is generated on the basis of the information regarding the authenticatee. For example, the "information regarding the authenticatee" is identification information (identifier, ID), a password, or the like for identifying the portable device 100. In other words, the ID and the password themselves are not transmitted/received. This makes it possible to prevent eavesdropping. Therefore, it is possible to further enhance security by performing authentication based on the distance, in addition to the request response authentication. For example, in the case where the request response authentication is performed between the portable device 100 and the control unit 210 before the authentication based on the distance, the information regarding the specific function may be transmitted in such a manner that the information regarding the specific function is attached to the authentication response signal transmitted from the portable device 100.

In addition, the information regarding the specific function of the portable device 100 may be stored in the storage section 215 in advance. For example, the storage section preliminarily stores the identification information for identifying the portable device 100 and the information regarding the specific function of the portable device 100 in association with each other. The control unit 210 receives the identification information for identifying the portable device 100, from the portable device 100. Examples of a method for acquiring the identification information include acquisition of the identification information from the authentication response signal. It is possible to acquire the information regarding the specific function of the portable device 100 identified by the identification information, from the storage section 215 on the basis of such identification information. Note that, the storage section 215 may store a plurality of pieces of the identification information and information regarding specific functions of the respective portable devices 100 identified by their pieces of identification information. In addition, it is also possible for the control unit 210 to identify the portable device 100 not only by using the identification information transmitted from the portable device 100 but also by using another method. For example, it is also possible to identify the portable device 100 on the basis of a timing at which the portable device 100 transmits any signal. The any signal may be the authentication response signal.

In addition, according to the present embodiment, it is possible to adopt both the above-described method of acquiring information from the portable device 100 and the above-described method of acquiring information from the storage section 215, with regard to the method of acquiring the information regarding the specific function of the portable device 100. For example, the control unit 210 may acquire the information regarding the specific function from the storage section 215 in the case where the information regarding the specific function has not been acquired from the portable device 100.

Information Regarding State of Portable Device 100

Examples of the information regarding the state of the portable device 100 include information indicating an amount of battery charge remaining in the portable device 100. In addition, examples of the information regarding the state of the portable device 100 include information indicating a communication state of the portable device 100. Examples of the information indicating the communication state of the portable device 100 include the reception electric power and the SNR to be used for wireless communication for authentication.

The control unit 210 may acquire the information regarding the state of the portable device 100, from the portable device 100. In other words, the portable device 100 transmits a signal including the information regarding the state of the portable device 100 itself, to the control unit 210. In a way similar to the case of transmitting the information regarding the specific function as described above, any frequency and any standard can be used for transmitting a signal including the information regarding the state. In addition, in a way similar to the case of transmitting the information regarding the specific function as described above, any other signal may also serve as the signal including the information regarding the state.

The acquisition of the predetermined information in Step S103 of FIG. 2 has been described above.

Next, the control unit 210 determines whether or not a predetermined condition is satisfied (Step S106). The predetermined condition is a condition for determining whether or not to execute the authentication process based on a distance. Specifically, for example, examples of the predetermined condition include a condition regarding the specific function and a condition regarding the state of the portable device 100. According to the present embodiment, a condition for preventing execution of the authentication process based on a distance is defined in advance as the predetermined condition. The control unit 210 determines whether or not the predetermined condition is satisfied on the basis of the acquired information regarding the specific function of the portable device 100 or the acquired information regarding the state of the portable device 100.

More specifically, examples of the condition regarding the specific function of the portable device 100 include a condition that the portable device 100 does not include the communication section configured to communicate information to be used for measuring the distance. For example, the communication section is capable of performing communication by using the UWB signal. In addition, examples of the condition regarding the state of the portable device 100 include a condition that the amount of battery charge remaining in the portable device 100 falls below a predetermined threshold. In addition, the examples of the condition regarding the state of the portable device 100 include a condition that the communication state of the portable device 100 does not satisfy a predetermined requirement. Examples of a situation where "the communication state of the portable device 100 does not satisfy the predetermined requirement" include a situation where the reception electric power or the signal-to-noise ratio (SNR) to be used for wireless communication for authentication is less than or equal to a predetermined value. In the case where such a condition is satisfied, it is highly possible that sufficient information to be used for the authentication is not transmitted or received and the authentication ends in failure. This may result in waste of electric power. Accordingly, the above-described conditions are defined as the conditions for preventing execution of the authentication process based on a distance.

Next, in the case where it is determined that the predetermined condition is satisfied (YES in Step S106), the control unit 210 does not execute the authentication process based on the distance (Step S112). This allows the control unit 210 to prevent the unnecessary authentication process from being executed and reduce electric power consumption. As described above, the "authentication process based on the distance" includes the ranging process of measuring the distance between the portable device 100 and the control unit 210, and the authentication process of performing authentication on the basis of the distance measured through the ranging process. For example, the control unit 210 may prevent execution of the authentication process based on the distance by transmitting or receiving no information to be used for the ranging process. It can be said that, the wording "transmitting or receiving no information to be used for the ranging process" means that the communication is non-executable. In addition, it can be said the wording "prevent execution of the authentication process based on the distance" means that the authentication process based on the distance is non-executable. More specifically, the control unit 210 makes the communication non-executable by supplying no power to the wireless communication section 211. In addition, the control unit 210 may make the communication non-executable by preventing the wireless communication section 211 from transmitting the predetermined signal to be used for the ranging process. In addition, the control unit 210 may make the communication non-executable by preventing the wireless communication section 211 from receiving the predetermined signal to be used for the ranging process. Examples of preventing the wireless communication section 211 from receiving the signal includes a situation where the received signal is not sampled, a situation where information obtained through the sampling is not output to a process in a subsequent stage (the control section 213), and other situations. The sampling of the signal means import of the signal. The process in the subsequent stage is a process of using the imported signal. Details of the ranging process will be described later with reference to FIG. 3.

On the other hand, in the case where it is determined that the predetermined condition is not satisfied (NO in Step S106), the control unit 210 executes the authentication process based on the distance (Step S109).

Next, the ranging process included in the "authentication process based on the distance" illustrated in Step S109 and Step S112 will be described with reference to FIG. 3.

Ranging Process

Figure 3:
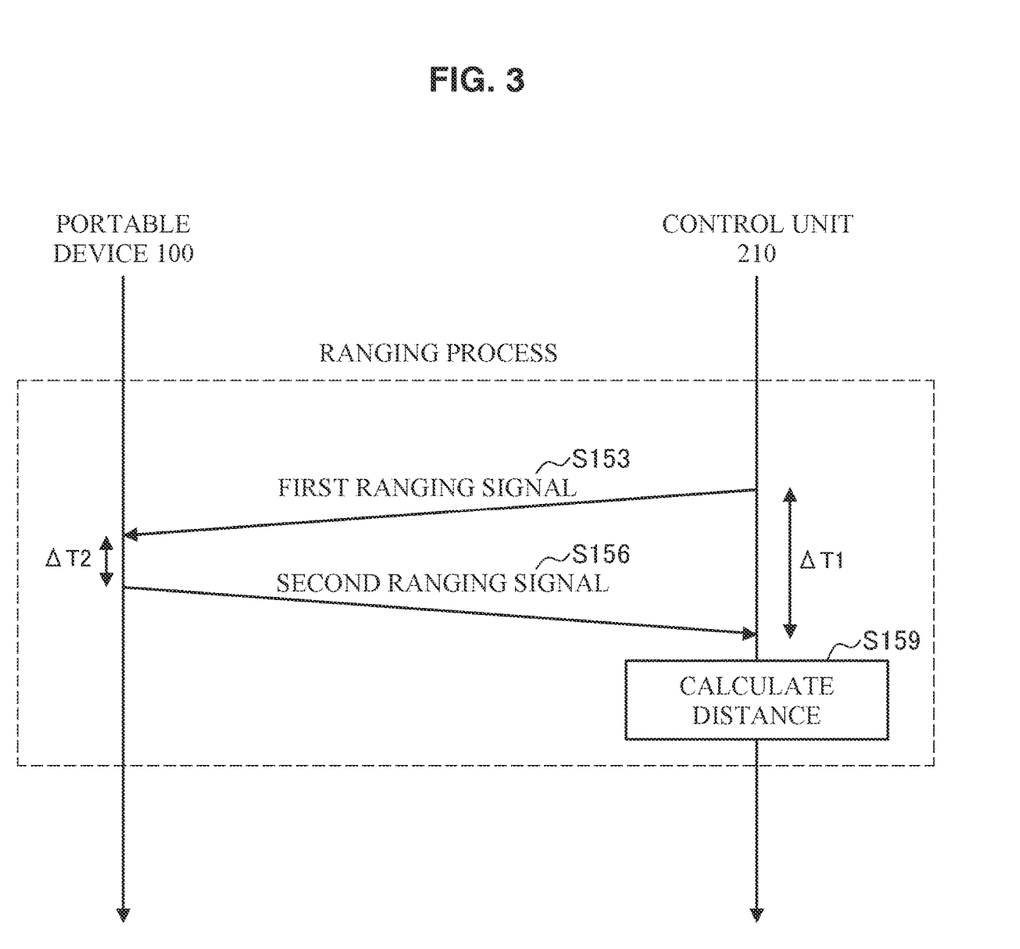
FIG. 3 is a sequence diagram illustrating an example of a flow of a ranging process according to the embodiment.

FIG. 3 is a sequence diagram illustrating an example of a flow of the ranging process according to the present embodiment. First, the control unit 210 transmits a first ranging signal (Step S153).

Next, when the first ranging signal is received from the control unit 210 and a time period $\Delta T2$ elapses after the reception of the first ranging signal, the portable device 100 transmits a second ranging signal (Step S156). The time period $\Delta T2$ is a pre-designated time period. The time period $\Delta T2$ is set to be longer than a time period estimated to be required for a process from time when the portable device 100 receives the first ranging signal to time when the portable device 100 transmits the second ranging signal. This makes it possible to certainly finish preparation for transmission of the second ranging signal before the time period $\Delta T2$ elapses after reception of the first ranging signal. The time period $\Delta T2$ may be known to the control unit 210.

Next, when the second ranging signal is received, the control unit 210 calculates a distance between the portable device 100 and the control unit 210 (Step S159). Specifically, the control unit 210 measures the time period $\Delta T1$ from transmission time of the first ranging signal to reception time of the second ranging signal, and calculates the distance on the basis of the measured time period $\Delta T1$ and the known time period $\Delta T2$. Specifically, time taken to transmit or receive a one-way signal is calculated by subtracting $\Delta T2$ from $\Delta T1$ and dividing the subtracted value by 2, and then the distance between the portable device 100 and the control unit 210 is calculated by multiplying the calculated value by speed of the signal.

Note that, the time period $\Delta T2$ does not have to be known to the control unit 210. For example, the portable device 100 measures the time period $\Delta T2$ and reports the measured time period $\Delta T2$ to the control unit 210. Such a report may be made by transmitting a data signal including information obtained by encrypting information indicating the time period $\Delta T2$. The data signal is another example of the signal for the ranging process. The data signal is a signal that stores and carries data. The data signal is configured in the frame format that includes the payload part for storing the data. In addition, the data signal may be transmitted and received as the UWB signal.

The Ranging Process has been described above.

For example, the control unit 210 may make the authentication process based on the distance illustrated in Step S112 non-executable, to prevent the first ranging signal from being transmitted.

4. Modifications

Next, as a modification of the embodiment of the present invention, a case where the portable device 100 transmits a signal for instructing to transmit the first ranging signal (which is a signal that triggers the ranging, and is also referred to as a "ranging trigger signal" in this specification) before transmission of the first ranging signal, will be described. In this case, the control unit 210 waits for reception of the ranging trigger signal.

The wording "waits for reception" means a situation where a process of importing a signal starts when the signal is received. In addition, the process of waiting for reception includes various kinds of processes for obtaining a desired signal. Examples of the various kinds of processes include a process in which an antenna of the wireless communication section 211 receives a signal, a process in which the signal received by the wireless communication section 211 is sampled, a process in which the control section 213 performs a process based on a signal obtained through the sampling, and other processes. For example, the "process based on a signal obtained through the sampling" is a process of determining whether or not the desired signal is obtained. The state of waiting for reception is also referred to as a reception waiting state. In addition, a period in which the device in the reception waiting state is also referred to as the reception waiting period. The control unit 210 according to the present modification transitions to the state of waiting for reception of the ranging trigger signal at any timing, and waits for reception of the ranging trigger signal. The "state of waiting for reception of the ranging trigger signal" is a state where the wireless communication section 211 is continuously sampling signals received by the antenna, for example.

Next, details of the present modification will be described with reference to FIG. 4.

Figure 4:
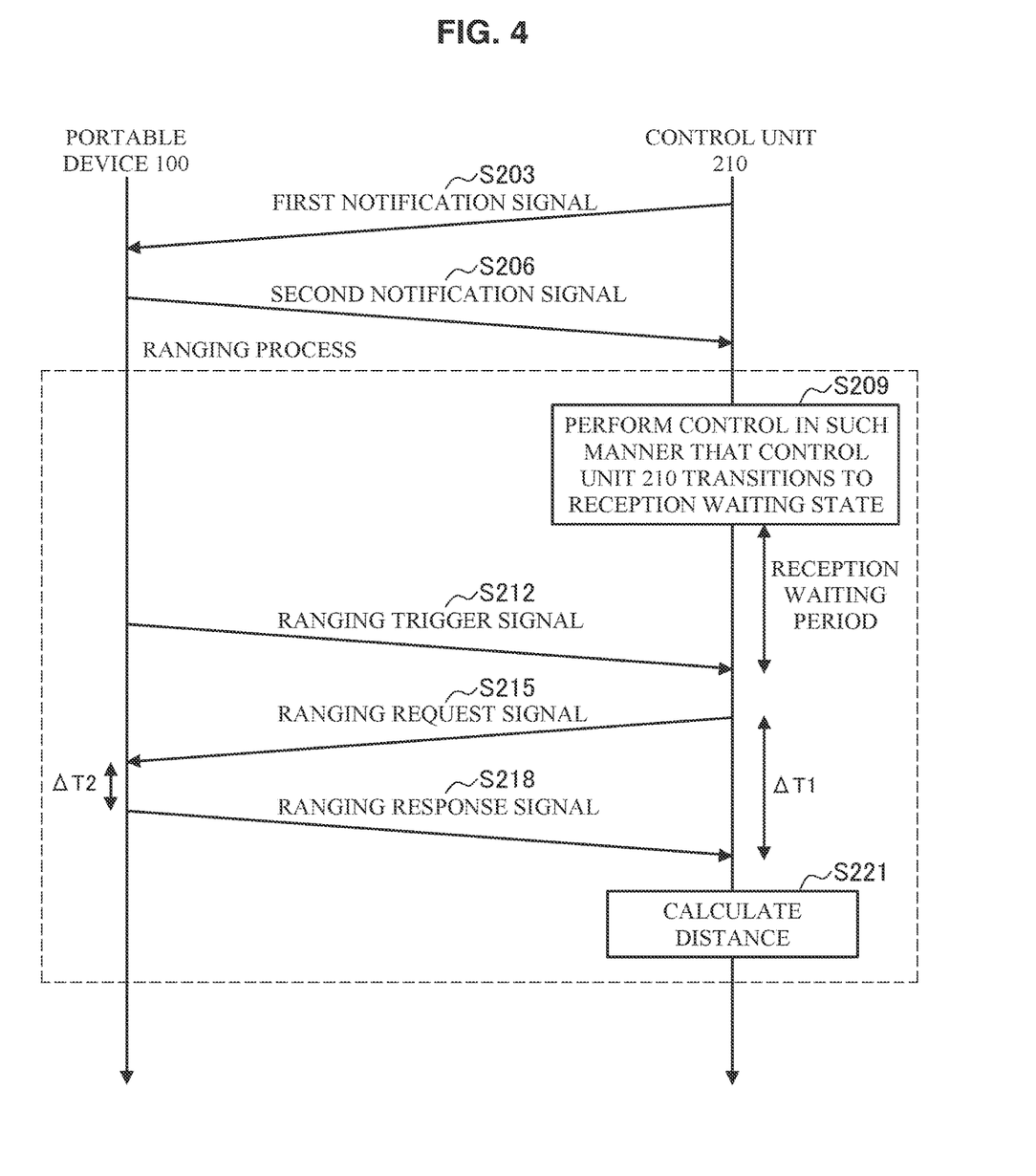
FIG. 4 is a sequence diagram illustrating an example of a flow of a ranging process according to a modification of the embodiment.

FIG. 4 is a sequence diagram illustrating an example of a flow of the ranging process according to the modification of the embodiment of the present invention. Note that, in this sequence, any other signal is transmitted and received between the portable device 100 and the control unit 210 before waiting for reception of the ranging trigger signal, for example. For example, the request response authentication is performed between the portable device 100 and the control unit 210. In the request response authentication, the authentication request signal and the authentication response signal generated on the basis of the authentication request are transmitted and received. In addition, it is also possible to transmit/receive a wake-up signal for instructing to activate the device, and a response to the wake-up signal between the portable device 100 and the control unit 210. The wake-up signal causes a receiver to wake up from a sleep mode. Examples of the response to the wake-up signal include an acknowledgment (ACK) signal that indicates activation, and a negative acknowledgement (NACK) signal that indicates non-activation. Alternatively, before waiting for reception of the ranging trigger signal, a response to the wake-up signal may be communicated and the request response authentication may be performed between the portable device 100 and the control unit 210. The control unit 210 starts waiting for reception on the basis of such a response to the wake-up signal and the request response authentication.

In addition, a signal transmitted from one device to another device with regard to the response to the wake-up signal and the request response authentication is also referred to as a first notification signal in this specification. In addition, a signal transmitted from the device that has received the first notification signal to the device that has transmitted the first notification signal is also referred to as a second notification signal. In addition, any frequency band may be used for transmitting the first and second notification signals. For example, the notification signal may be transmitted by using a same frequency band as the ranging signal, or a different frequency band from the ranging signal. In addition, the notification signal may be transmitted as the UWB signal, the LF band signal, the RF band signal, or the Bluetooth Low Energy (BLE) (registered trademark) signal.

As illustrated in FIG. 4, the control unit 210 first transmits the first notification signal (Step S203).

Next, when the first notification signal is received, the portable device 100 transmits the second notification signal (Step S206).

Next, when the second notification signal is received, the control unit 210 performs control in such a manner that the control unit 210 transitions to the reception waiting state of waiting for reception of the ranging trigger signal (Step S209). A timing of transitioning to the reception waiting state may be a timing of receiving the authentication response signal, a time period of authenticating the portable device 100 on the basis of the authentication response signal, or a timing after the authentication ends. Alternatively, the timing of transitioning to the reception waiting state may be a timing of receiving a response to the wake-up signal, a time period of determining whether or not the received response is the ACK signal, or a timing after the determination ends. The control unit 210 starts waiting for reception on the basis of the response to the wake-up signal and the request response authentication. This makes it possible to shorten the reception waiting period.

Note that, before the transition to the reception waiting state (before the control unit 210 starts waiting for reception), the control unit 210 is controlled in such a manner that the reception waiting state is suspended, such as a state where the signal received by the antenna is not sampled, or a state where a process based on the signal obtained through the sampling is not performed, for example. The "state where a process based on the signal obtained through the sampling is not performed" is a state where information obtained through the sampling is not transmitted to a process in a subsequent stage, for example. Such a state is also referred to as a normal state in this specification. Electric power consumed in the normal state is lower than the reception waiting state. Therefore, it is possible to shorten the reception waiting period and reduce electric power consumption, when the control unit 210 starts waiting for reception on the basis of reception of the wake-up signal and the request response authentication.

Next, the portable device 100 transmits the ranging trigger signal (Step S212). For example the UWB signal is used for the ranging trigger signal.

Next, when the ranging trigger signal is received, the control unit 210 transmits a ranging request signal for requesting transmission of the second ranging signal, as the first ranging signal (Step S215). The reception waiting period ends at a timing of receiving the ranging trigger signal. In other words, the control unit 210 performs control in such a manner that the control unit 210 transitions to a transmission state of transmitting the ranging request signal when the ranging trigger signal is received. The transmission state is a state of executing various kinds of processes of outputting the ranging request signal as a radio wave from the antenna. Examples of the various kinds of processes includes generation of a transmission signal, modulation based on the transmission signal, transmission of the radio wave from the antenna, and the like.

Next, when the ranging request signal (first ranging signal) is received from the control unit 210 and a time period ΔT2 elapses after the reception of the ranging request signal, the portable device 100 transmits a ranging response signal in response to the ranging request signal, as the second ranging signal (Step S218).

Next, when the ranging response signal (second ranging signal) is received, the control unit 210 calculates a distance between the portable device 100 and the control unit 210 (Step S221). Specifically, the control unit 210 measures the time period ΔT1 from transmission time of the first ranging signal to reception time of the second ranging signal, and calculates the distance on the basis of the measured time period ΔT1 and the known time period ΔT2.

The ranging process of receiving the ranging trigger signal before transmission and reception of the ranging signal has been described above. When the ranging trigger signal is received, the control unit 210 performs a process of transmitting the ranging request signal, as the first ranging signal. Here, in the case where it is determined that the predetermined condition in Step S106 of FIG. 2 is satisfied, the control unit 210 may make the authentication process based on the distance non-executable by preventing the ranging request signal from being transmitted even if the ranging trigger signal is received from the portable device 100. It may be determined whether or not the predetermined condition is satisfied before, after, or in parallel with the control performed to transition to the reception waiting state. In addition, for example, predetermined information for determining whether or not the predetermined condition is satisfied may be attached to the second notification signal.

In addition, in the case where it is determined that the predetermined condition illustrated in Step S106 of FIG. 2 is satisfied, the control unit 210 may make the authentication process based on the distance illustrated in Step S112 of FIG. 2 non-executable by not performing control for the reception waiting state, or by suspending the reception waiting state (by returning to the normal state). The control unit 210 may determine whether or not the predetermined condition is satisfied before, after, or in parallel with the control performed to transition to the reception waiting state. By shortening or eliminating the reception waiting period, it is also possible to reduce electric power consumption. In particular, a large effect of reducing electric power consumption is obtained in the case where the UWB signal is used for the ranging trigger signal. Specifically, one of features of the UWB is an ultra-wide frequency band while sampling frequency of the receiver is set depending on a maximum value of frequency of a carrier wave. Therefore, the receiver consumes a large amount of electric power. Therefore, in the case of using the UWB, it is possible to drastically reduce electric power to be consumed by the control unit 210 by shortening the reception waiting period in which large electric power is consumed, or by controlling in such a manner that the control unit 210 does not transition to the reception waiting state.

Next, with reference to FIG. 5 and FIG. 6, a plurality of detailed examples of an operation process of reducing electric power consumption by controlling transition to the reception waiting state in the above-described ways will be described.

First Specific Example

Figure 5:
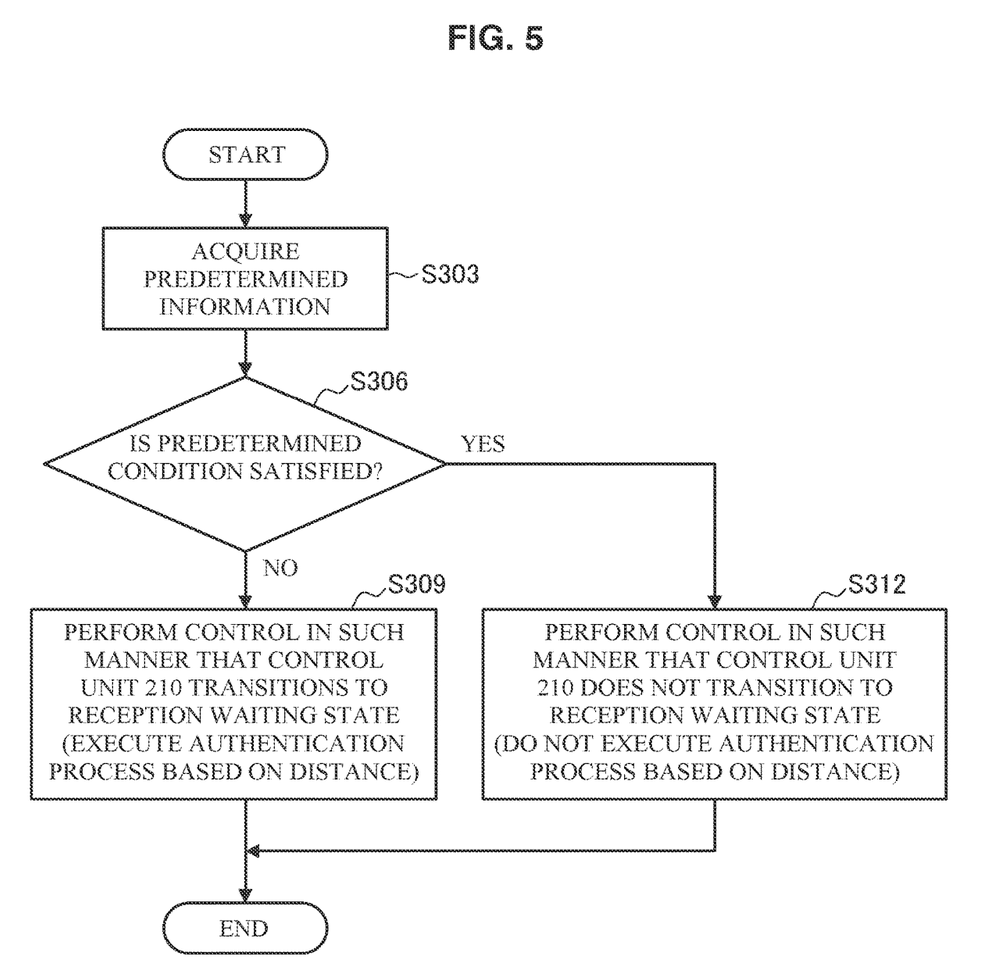
FIG. 5 is a flowchart illustrating an example of a flow of an operation process of a control unit according to a modification of the embodiment.

FIG. 5 is a flowchart illustrating an example of a flow of an operation process of the control unit 210 according to the modification of the embodiment of the present invention. As illustrated in FIG. 5, the control unit 210 acquires predetermined information to be used for determining whether or not to execute the authentication process based on the distance (Step S303). For example, the predetermined information may be attached to the second notification signal transmitted from the portable device 100. Details of the predetermined information is similar to the information described with regard to the process illustrated in Step S103 of FIG. 2. Therefore, repeated description thereof will be omitted here.

Next, the control unit 210 determines whether or not a predetermined condition is satisfied (Step S306). Details of the predetermined condition is similar to the condition described with regard to the process illustrated in Step S106 of FIG. 2. Therefore, repeated description thereof will be omitted here.

Next, in the case where it is determined that the predetermined condition is satisfied (YES in Step S306), the control unit 210 performs control in such a manner that the control unit 210 does not transition to the reception waiting state of waiting for reception of the ranging trigger signal, and thereby does not execute the authentication process based on the distance (Step S312). In other words, the wording "performs control in such a manner that the control unit 210 does not transition to the reception waiting state" means that the control unit 210 does not start waiting for reception. In addition, more specifically, the wording "performs control in such a manner that the control unit 210 does not transition to the reception waiting state" means that the signal received by the antenna is not sampled, or that the process based on the signal obtained through the sampling is not performed (for example, a state where the information obtained through the sampling is not transmitted to a process in a subsequent stage, for example.

Accordingly, the control unit 210 does not transition to the reception waiting state in the case where the predetermined condition is satisfied. This makes it possible to prevent the unnecessary authentication process from being executed and reduce electric power consumption. As described above, the case where the predetermined condition is satisfied is a case where the portable device 100 does not include the communication section capable of transmitting and receiving the signal (including the ranging trigger signal) to be used for the ranging signal, for example. In this case, even when the control unit 210 starts waiting for reception of the ranging trigger signal, the portable device 100 does not transmit the ranging trigger signal. This results in waste of electric power in the reception waiting period. Therefore, it is possible to reduce electric power consumption by causing the control unit 210 not to transition to the reception waiting state in the case where the predetermined condition is satisfied. In addition, in the case where the predetermined condition is satisfied, the authentication process based on the distance is non-executable. However, the control unit 210 may perform various kinds of control in accordance with a result of authentication performed through another method such as the request response authentication. Examples of the "various kinds of control" include control for opening the door lock of the vehicle 200, control for starting the engine, and the like.

On the other hand, in the case where it is determined that the predetermined condition is not satisfied (NO in Step S306), the control unit 210 performs control in such a manner that the control unit 210 transitions to the reception waiting state of waiting for reception of the ranging trigger signal, and thereby executes the authentication process based on the distance (Step S309). This makes it possible to perform authentication based on the distance in an appropriate environment, and it is possible to waste electric power in the reception waiting state.

Second Specific Example

Figure 6:
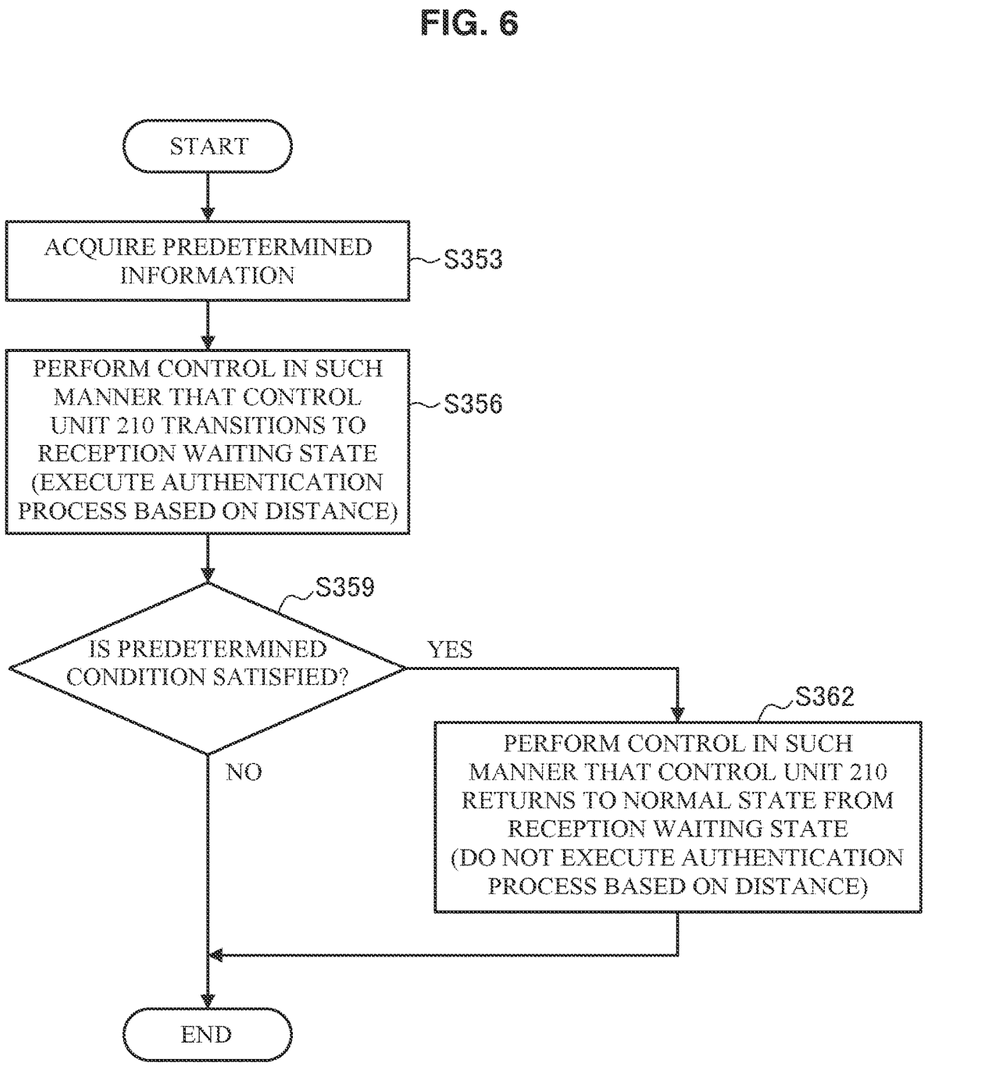
FIG. 6 is a flowchart illustrating another example of a flow of an operation process of the control unit according to the modification of the embodiment.

FIG. 6 is a flowchart illustrating another example of a flow of an operation process of the control unit 210 according to the modification of the embodiment of the present invention. As illustrated in FIG. 6, the control unit 210 acquires predetermined information to be used for determining whether or not to execute the authentication process based on the distance (Step S353). For example, the predetermined information may be attached to the second notification signal transmitted from the portable device 100. Details of the predetermined information is similar to the information described with regard to the process illustrated in Step S103 of FIG. 2. Therefore, repeated description thereof will be omitted here.

Next, the control unit 210 performs control in such a manner that the control unit 210 transitions to the reception waiting state of waiting for reception of the ranging trigger signal, and thereby executes the authentication process based on the distance (Step S356). The control unit 210 may perform control in such a manner that the control unit 210 transitions to the reception waiting state at any timing. For example, the "any timing" is a timing of receiving the second notification signal transmitted from the portable device 100. Therefore, the control may be performed in such a manner that the control unit 210 transitions to the reception waiting state, before, after, or in parallel with acquisition of the predetermined information as illustrated in Step S355 described above.

Next, the control unit 210 determines whether or not a predetermined condition is satisfied (Step S359). Details of the predetermined condition is similar to the condition described with regard to the process illustrated in Step S106 of FIG. 2. Therefore, repeated description thereof will be omitted here.

Next, in the case where it is determined that the predetermined condition is satisfied (YES in Step S359), the control unit 210 suspends (cancels) the reception waiting state of waiting for reception of the ranging trigger signal. In other words, the control unit 210 performs control in such a manner that the control unit 210 returns to the normal state.

This makes it possible to make the authentication process based on the distance non-executable (Step S362). More specifically, examples of suspending the reception waiting state include suspension of sampling of the signal received by the antenna, suspension of performing the process based on the signal obtained through the sampling, and the like. Examples of the "suspension of performing the process based on the signal obtained through the sampling" include suspension of transmission of the information obtained through the sampling to the process in the subsequent stage. Such a state where the reception waiting state is suspended is referred to as the normal state. This makes it possible to end the reception waiting period without waiting for timeout. In particular, in the case of using the UWB, it is possible to drastically reduce electric power consumption. Specifically, the wording "end the reception waiting period without waiting for timeout" described above means that the reception waiting period ends before a pre-designated time elapses.

As described above, in the example illustrated in FIG. 6, it is possible to perform control in such a manner that the control unit 210 transitions to the reception waiting state at any timing before determining whether or not the predetermined condition is satisfied. This makes it possible to transition to the reception waiting state more earlier without waiting for a determination on whether or not the predetermined condition is satisfied. On the other hand, in the case where the predetermined condition is satisfied, it is also possible to quickly suspend the reception waiting state and reduce electric power consumption.

5. Supplement

Although details of the preferable embodiments of the present invention have been described above with reference to the appended drawings, the present invention is not limited thereto. It will be clear to a person of ordinary skill in the art of the present invention that various modifications and improvements may be obtained within the scope of the technical idea recited by the scope of the patent claims, and these should obviously be understood as belonging to the range of the technology of the present invention.

For example, although the example in which the authenticator transmits the first ranging signal has been described in the above embodiment, the present invention is not limited thereto. The authenticator is the control unit 210 of the vehicle 200, for example. For example, it is also possible for the authenticatee to transmit the first ranging signal. The authenticatee is the portable device 100, for example. When the first ranging signal is received from the portable device 100, the control unit 210 transmits the second ranging signal in response to the first ranging signal. When the second ranging signal is received, the portable device 100 measures the time period $\Delta T1$ that is a time period from transmission time of the first ranging signal to reception time of the second ranging signal. Next, the portable device 100 transmits the data signal including information obtained by encrypting information indicating the measured time period $\Delta T1$. On the other hand, the control unit 210 measures the time period $\Delta T2$ from reception time of the first ranging signal to transmission time of the second ranging signal. Next, when the data signal is received from the portable device 100, the control unit 210 calculates the distance between the portable device 100 and the control unit 210 on the basis of the measured time period $\Delta T2$ and the time period $\Delta T1$ indicated by the data signal received from the portable device 100. For example, time taken to transmit or receive a one-way signal is calculated by subtracting $\Delta T2$ from $\Delta T1$ and dividing the subtracted value by 2, and then the distance between the portable device and the control unit is calculated by multiplying the calculated time by speed of the signal. As described above, in the case where the directions of transmitting and receiving the first ranging signal and the second ranging signal are reversed, the control unit 210 performs control in such a manner that the control unit 210 transitions to the waiting state of waiting for the first ranging signal transmitted from the portable device 100. The control unit 210 may transitions to the waiting state of waiting for the first ranging signal at any timing. The control unit 210 determines whether or not the predetermined condition in Step S106 is satisfied even in the above-described case. In the case where the predetermined condition is satisfied, the transition to the waiting state of waiting for the first ranging signal is canceled or suspended. This makes it possible to reduce electric power consumption.

In addition, in the above-described embodiments, a condition for determining whether or not to execute the authentication process based on a distance is designated as the predetermined condition. However, the present invention is not limited thereto. For example, it is also possible to designate a condition for determining whether or not to execute another authentication process such as the request response authentication. In the case where such a condition is satisfied, the control unit 210 makes other corresponding authentication processes non-executable. This makes it possible to reduce electric power consumption.

In addition, although the example in which the portable device 100 serves as the authenticatee and the control unit 210 of the vehicle 200 serves as the authenticator has been described in the above embodiment, the present invention is not limited thereto. The roles of the portable device 100 and the control unit 210 of the vehicle 200 may be reversed, or the roles may be switched dynamically. In addition, the ranging and authentication may be performed between the control units 210 of the vehicles 200.

In addition, for example, although the example in which the present invention is applied to the smart entry system has been described in the above embodiment, the present invention is not limited thereto. The present invention is applicable to any system that performs the ranging and authentication by transmitting/receiving signals. Examples of the target to be used by the user includes a drone, a vehicle, a ship, an airplane, building, a robot, a locker, and a home appliance, and the like. Examples of the building include a house and the like. In addition, the present invention is applicable to a pair of any two devices selected from a group including portable devices, vehicles, ships, airplanes, smartphones, drones, buildings, robots, lockers, home appliances, and the like. Note that, the pair may include two device of a same type, or may include two devices of different types. In this case, one of the devices operates as a first communication device and the other device operates as a second communication device.

In addition, for example, in the above embodiment, the standard using UHF/LF and UWB has been exemplified as the wireless communication standard. However, the present invention is not limited thereto. For example, it is also possible to use a standard using infrared as the wireless communication standard.

In addition, for example, although the above embodiment has been described on the assumption that the control section 213 is configured as the ECU and controls overall operation of the control unit 210, the present invention is not limited thereto. For example, the wireless communication section 211 may include an ECU. In addition, the wireless communication section 211 may executes the process of determining whether or not the predetermined condition is satisfied, and the process of controlling transition to the reception waiting state. In addition, the wireless communication section 211 may execute the process of performing a process based on the signal obtained by sampling the signal received from the antenna. For example, the "process based on the signal obtained by sampling the signal received from the antenna" is a process of determining whether or not a desired signal is obtained.

Note that, the series of processes performed by the devices described in this specification may be achieved by any of software, hardware, and a combination of software and hardware. A program that configures the software is stored in advance in, for example, a recording medium (non-transitory medium) installed inside or outside the devices. In addition, for example, when a computer executes the programs, the programs are read into RAM, and executed by a processor such as a CPU. The recording medium may be a magnetic disk, an optical disc, a magneto-optical disc, flash memory, or the like, for example. Alternatively, the above-described computer program may be distributed via a network without using the recording medium, for example.

Further, in this specification, the processes described using the sequence diagrams and flowcharts are not necessarily executed in the order illustrated in the drawings. Some processing steps may be executed in parallel. In addition, additional processing steps may be employed and some processing steps may be omitted.

REFERENCE SIGNS LIST 100 portable device
120 control section
110 wireless communication section
130 storage section
200 vehicle
210 control unit
211 wireless communication section
213 control section
215 storage section

What is claimed is:

1. A control device, comprising:
a controller configured to perform an authentication process of authenticating another device by using information obtained through communication with the another device,
wherein, in a case where a predetermined condition is satisfied, the controller performs control in such a manner that the authentication process is not performed,
wherein, as the authentication process, the controller uses a process of authenticating the another device on a basis of a distance that has been measured by using the information,
wherein the controller uses a condition regarding a specific function of the another device, as the predetermined condition, and
wherein the controller uses a condition that the another device does not include a communicator for communicating information to be used for measuring the distance, as the condition regarding the specific function.

2. The control device according to claim 1,
wherein the controller acquires information indicating whether or not the another device includes the communicator, from the another device.

3. The control device according to claim 1,
wherein the controller determines whether or not the communicator is included in the another device identified by identification information that is transmitted from the another device to identify the another ether device, on a basis of the identification information and pre-registered information indicating whether or not the communicator is included in one or more another devices.

4. The control device according to claim 1,
wherein the controller uses a condition that amount of battery charge remaining in the another device falls below a predetermined threshold, as the condition regarding the state of the another device.

5. The control device according to claim 1,
wherein the controller treats a situation where communication of information to and from the communicator included in the other device is non-executable, as a situation where the authentication process is not performed.

6. The control device according to claim 5,
wherein the controller treats a situation where a process of receiving a predetermined signal to be used for the authentication process from the another device and importing the received signal is not executed, as the situation where the communication is non-executable.

7. The control device according to claim 5,
wherein the controller treats a situation where information obtained through a process of receiving a predetermined signal to be used for the authentication process from the another device and importing the received signal is not transmitted to a process using the imported signal, as the situation where the communication is non-executable.

8. The control device according to claim 1,
wherein the control device is installed in a mobile object, and
the another device is a device carried by a user who uses the mobile object.

9. A control device, comprising:
a controller configured to perform an authentication process of authenticating another device by using information obtained through communication with the another device,
wherein, in a case where a predetermined condition is satisfied, the controller performs control in such a manner that the authentication process is not performed,
wherein the controller uses a condition regarding a state of the another device, as the predetermined condition, and
wherein the controller uses a condition that a state of communication performed by the another device does not satisfy a designated requirement, as the condition regarding the state of the another device.

10. A control method, comprising:
performing control by a controller, in such a manner that a processor performs an authentication process of authenticating another device by using information obtained through communication with the another device, wherein, in a case where a predetermined condition is satisfied, control is performed in such a manner that the authentication process is not performed, wherein, as the authentication process, the controller uses a process of authenticating the another device on a basis of a distance that has been measured by using the information, wherein the controller uses a condition regarding a specific function of the another device, as the predetermined condition, and wherein the controller uses a condition that the another device does not include a communicator for communicating information to be used for measuring the distance, as the condition regarding the specific function.

* * * * *